(12) United States Patent
Nakagawa

(10) Patent No.: US 9,924,089 B2
(45) Date of Patent: Mar. 20, 2018

(54) IMAGE CAPTURING APPARATUS, METHOD OF DISPLAYING IMAGE, AND STORAGE MEDIUM STORING PROGRAM

(71) Applicant: CANON KABUSHIKI KAISHA, Tokyo (JP)

(72) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/018,608

(22) Filed: Feb. 8, 2016

(65) Prior Publication Data

US 2016/0234426 A1 Aug. 11, 2016

(30) Foreign Application Priority Data

Feb. 10, 2015 (JP) .................. 2015-024483

(51) Int. Cl.
*G02B 13/16* (2006.01)
*H04N 5/225* (2006.01)
*H04N 5/232* (2006.01)
*H04N 5/235* (2006.01)

(52) U.S. Cl.
CPC ....... *H04N 5/23212* (2013.01); *H04N 5/2356* (2013.01); *H04N 5/23293* (2013.01)

(58) Field of Classification Search
CPC ............. H04N 5/23212; H04N 5/2356; H04N 5/23293

USPC ................ 348/335, 340, 345, 348, 350, 352
See application file for complete search history.

(56) References Cited

U.S. PATENT DOCUMENTS

| 2008/0068487 A1* | 3/2008 | Morita | G03B 13/00 348/333.05 |
| 2011/0298961 A1* | 12/2011 | Yoshida | G03B 13/36 348/333.01 |
| 2014/0320736 A1* | 10/2014 | Tomita | G02B 7/34 348/353 |

FOREIGN PATENT DOCUMENTS

JP 2011-48341 A 3/2011

* cited by examiner

*Primary Examiner* — Yogesh Aggarwal
(74) *Attorney, Agent, or Firm* — Canon USA Inc., IP Division

(57) ABSTRACT

In an image capturing apparatus that sequentially photographs a plurality of images by changing a focus position of a lens unit by a predetermined amount, a display area is selected according to a ratio of a vertical line component to a horizontal line component of a main subject for each of the plurality of images photographed by the image capturing apparatus. A display unit displays a plurality of display areas corresponding to the focus detection area selected by the selection unit, by arranging the plurality of display areas side by side.

27 Claims, 11 Drawing Sheets

IMAGE CAPTURING APPARATUS, METHOD OF DISPLAYING IMAGE, AND STORAGE MEDIUM STORING PROGRAM

BACKGROUND OF THE INVENTION

Field of the Invention

The present invention relates to an image capturing apparatus where a focus can be finely adjusted, a display method of an image, and a storage medium storing a program for controlling the apparatus and executing the method.

Description of the Related Art

Conventionally, a technique of focus bracket photographing (focus bracketing) in which photographing is performed sequentially while changing a focal position is known. Japanese Patent Application Laid-Open No. 2011-48341 discloses a configuration in which a plurality of images photographed by the focus bracket photographing are displayed in thumbnails so that the images can be easily selected by a user.

However, with improved bracketing techniques, differences between images photographed by the focus bracket photographing can be too small and thus difficult to recognize. Therefore, a focus bracket photographing configuration is desired where a plurality of images can be easily compared and an appropriate one can be efficiently selected either automatically based on algorithmic processing or manually be a user.

SUMMARY OF THE INVENTION

An objective of the present invention is to provide an image capturing apparatus where the differences between a plurality of images obtained by focus bracket photographing can be more easily compared.

According to an aspect of the present invention, an image capturing apparatus includes a bracket photographing unit configured to sequentially photograph a plurality of images while changing a focus position of a lens unit, a selection unit configured to select one of a plurality of focus detection areas for the plurality of images photographed by the bracket photographing unit, and a display unit configured to display a plurality of display areas corresponding to the focus detection area selected by the selection unit, by arranging the plurality of display areas, wherein the display unit changes an arrangement direction of the plurality of display areas according to the focus detection area selected by the selection unit.

According to another aspect of the present invention, an image capturing apparatus includes a bracket photographing unit configured to sequentially photograph a plurality of images while changing a focus position of a lens, a calculation unit configured to calculate an evaluation value in a horizontal direction and an evaluation value in a vertical direction, and a display unit configured to select a display area for each of the plurality of images photographed by the bracket photographing unit and display a plurality of the display areas, wherein when the evaluation value in the horizontal direction for a main subject, which is calculated by the calculation unit, is higher than the evaluation value in the vertical direction, the display unit selects and displays a display area that is longer in the horizontal direction than in the vertical direction, and when the evaluation value in the vertical direction is higher than the evaluation value in the horizontal direction, the display unit selects and displays a display area that is longer in the vertical direction than in the horizontal direction, and the main subject is a subject to be focused.

According to yet another aspect of the present invention, an image capturing apparatus includes a bracket photographing unit configured to sequentially photograph a plurality of images while changing a focus position of a lens, a detection unit configured to detect a defocus amount of focus between signals of two images corresponding to a focus detection area, which are acquired with a predetermined parallax, a control unit configured to drive a focus lens based on a detection result of the detection unit, and a display unit configured to select a display area for each of the plurality of images photographed by the bracket photographing unit and display a plurality of the display areas by arranging the plurality of the display areas, wherein when the images are sequentially photographed, the detection unit detects a defocus amount of images in order to detect a focus, and the display unit selects and displays a display area so that a length in a direction in which the detection unit detects a defocus amount between two images for the detection result used by the control unit is longer than a length in a direction perpendicular to the direction in which the detection unit detects the defocus amount between two images.

Further features of the present invention will become apparent from the following description of exemplary embodiments with reference to the attached drawings.

DESCRIPTION OF THE EMBODIMENTS

Hereinafter, preferred embodiments of the present invention will be described in an exemplary manner. However, the shapes of components described in the embodiments and relative arrangements of the components should be appropriately changed according to a configuration and various conditions of an apparatus to which the present invention is applied, and it is not intended to limit the scope of the present invention to the embodiments described below.

First Embodiment

An image capturing apparatus according to a first embodiment will be described with reference to FIGS. 1 to 10. Here, a lens interchangeable type single-lens reflex (SLR) camera of phase-different AF method is illustrated as an example of the image capturing apparatus. In the phase-different AF method, a pair of subject images (two image signals having different parallaxes respectively), which are formed after passing through different positions of a photographing lens of a camera, are formed on a line sensor. These subject images are photoelectrically converted into a pair of subject image signals and a difference between the two images is obtained, so that the amount of defocus that indicates a focus adjustment state of the photographing lens to the subject is detected and the photographing lens is driven based on the amount of defocus. It is possible to apply the image capturing apparatus to a camera of imaging plane phase-different AF method and a camera of contrast AF system. Further, it is possible to apply the image capturing apparatus not only to a lens interchangeable type single-lens reflex camera, but also to other image capturing apparatuses such as a mirrorless single-lens reflex camera.

Description of Image Capturing Apparatus

Figure 1:
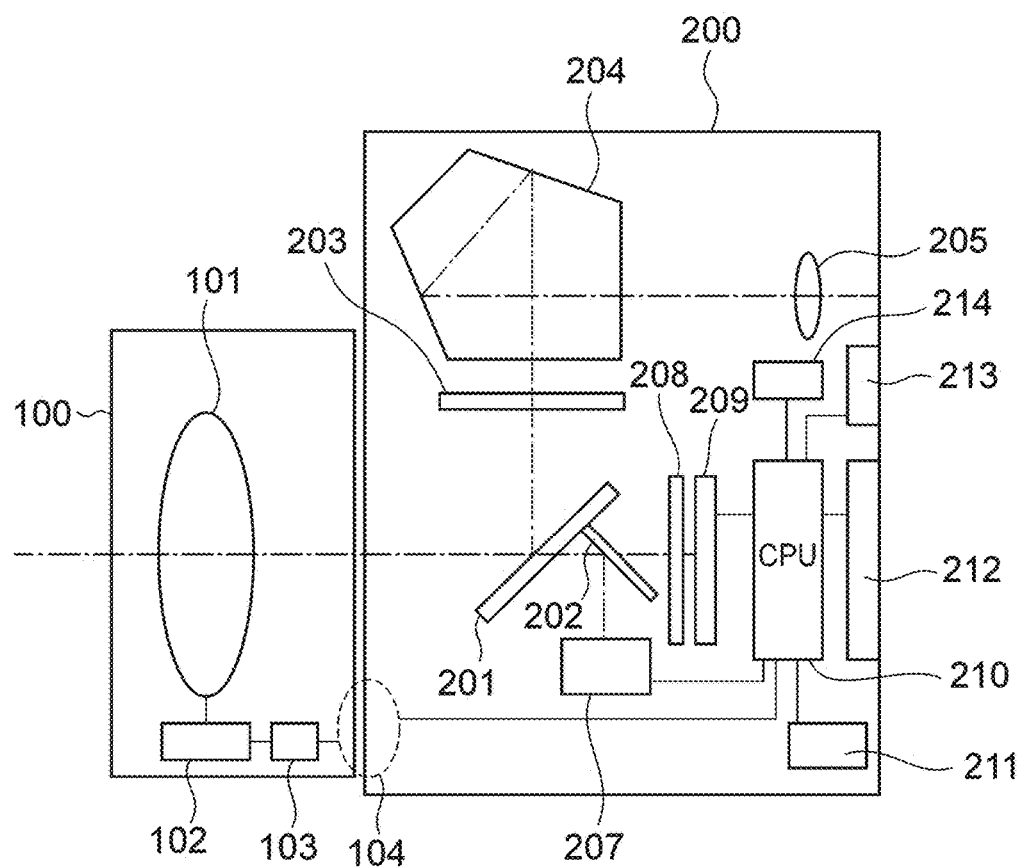
FIG. 1 is a schematic diagram of an image capturing apparatus.

First, a configuration of the image capturing apparatus will be described with reference to FIG. 1. FIG. 1 is a block diagram illustrating a configuration of the image capturing apparatus 200 according to a first embodiment. As illustrated in FIG. 1, a photographing lens 100 is detachably attached to the image capturing apparatus 200 through a lens attachment mechanism of a mount unit (not illustrated in FIG. 1). An electrical contact unit 104 is provided to the mount unit. The image capturing apparatus 200 communicates with the photographing lens 100 through the electrical contact unit 104 and controls a focus lens 101 (focus lens unit) and a diaphragm (not illustrated in FIG. 1) in the photographing lens 100. In FIG. 1, only the focus lens 101 is illustrated as a lens unit in the photographing lens 100. However, a photographing lens in which a plurality of lenses including a variable power lens and a fixed lens are provided in addition to a focus lens is generally used.

A light flux (not illustrated in FIG. 1) from a subject is guided to a main mirror 201 in the image capturing apparatus 200 through the focus lens 101 in the photographing lens 100. The main mirror 201 is arranged obliquely with respect to an optical axis in a photographing optical path and can move to a first position (the position where the main mirror 201 is illustrated in FIG. 1) at which the light flux from the subject is guided to a finder optical system above the main mirror 201 and a second position to which the main mirror 201 retracts (moves) out of the photographing optical path.

The entire main mirror 201 is a half mirror. When the main mirror 201 is located at the first position, part of the light flux from the subject passes through the main mirror 201 and part is guided as described above. The light flux that passes through the main mirror 201 is reflected by a sub-mirror 202 arranged in rear of the main mirror 201 and guided to a focus detection apparatus 207 that detects a focus state (the defocus amount of the focus). The focus detection apparatus 207 includes a focus detection sensor (not illustrated in FIG. 1) as a photoelectric conversion unit. A CPU 210 (a focus detection unit) detects the defocus amount of the focus by using a signal acquired from the focus detection sensor. In the present embodiment, the focus detection sensor may be implemented by a cross-line sensor.

On the other hand, the light flux reflected on the main mirror 201 forms an image on a focusing screen 203 arranged at a position optically conjugate with the image capturing element 209. Light (a subject image) which is diffused by the focusing screen 203 and which passes through the focusing screen 203 is converted into an erected image by a pentagonal roof prism 204. The erected image is enlarged by an eye piece lens 205 and is observed by a user.

When the main mirror 201 retreats to the second position, the sub-mirror 202 also retreats to out of the photographing optical path in a state in which the sub-mirror 202 is folded with respect to the main mirror 201. In this state, the light flux from the photographing lens 100 passes through a focal plane shutter 208, which is a mechanical shutter, and reaches the image capturing element 209. The focal plane shutter 208 limits the amount of light entering the image capturing element 209. The image capturing element 209 consists of a photoelectric conversion element such as a charge coupled device (CCD) sensor and a complementary metal oxide semiconductor (CMOS) sensor and generates an image by photoelectrically converting the subject image, which is an optical signal formed by the photographing lens 100, into an electrical signal. The CPU 210 provided in the image capturing apparatus 200 is a controller that controls the entire image capturing apparatus by performing controls and the like of various calculations and various operations in a camera.

The CPU 210 consists of a central processing unit (CPU), a micro processing unit (MPU), and the like. The CPU 210 communicates with a lens control circuit 103 in the photographing lens 100 through the electrical contact unit 104. The lens control circuit 103 (control unit) controls a lens driving mechanism 102 that performs focusing by driving the focus lens 101 in an optical axis direction according to a signal from the CPU 210. The lens driving mechanism 102 has a stepping motor as a drive source. A diaphragm control circuit not illustrated in FIG. 1 controls a diaphragm drive mechanism that drives the diaphragm not illustrated in FIG. 1 and adjusts the amount of light flux incident on the image capturing element based on a control signal of the lens control circuit 103 in the photographing lens 100 according to a signal from the CPU 210.

Further, an electrically erasable programmable read-only memory (EEPROM) 211 used as a memory is connected to the CPU 210.

In the EEPROM 211, parameters that are required to be adjusted to control the image capturing apparatus 200 and camera ID information that is unique information to identify the image capturing apparatus are recorded. Further, in the EEPROM 211, adjustment values of parameters related to photographing, which are adjusted by using a reference lens (a photographing lens used when adjusting the image capturing apparatus in a factory), are recorded. In the present embodiment, the photographing is to acquire an image. Further, an operation detection unit 213 that reflects user's operation to the image capturing apparatus 200 and a counter 214 are connected to the CPU 210. The counter 214 counts the number of times when the image capturing apparatus performs image capturing.

A display apparatus 212 is an apparatus that displays image data captured by the image capturing element 209 and an item that is set by a user. The display apparatus 212 is generally formed by a color liquid crystal display element.

The operation detection unit 213 detects an operation of a release button and a selection button which are not illustrated in FIG. 1 and a button that causes a user to select one of a plurality of images obtained by bracket photographing described later.

On the other hand, the lens control circuit 103 is provided with a memory (not illustrated in FIG. 1) that stores performance information such as a focal length and an open diaphragm value of the photographing lens 100, lens ID information to identify the photographing lens 100, and information received from the CPU 210 by communication. The performance information and the lens ID information are transmitted to the CPU 210 by initial communication performed when the photographing lens 100 is attached to the image capturing apparatus 200, and the CPU 210 stores the performance information and the lens ID information in the EEPROM 211.

AF Micro Adjustment Support (MAS) Mode

The image capturing apparatus according to the present embodiment has an AF micro adjustment function. The AF micro adjustment function is a system in which a user itself sets a correction amount (or a correction value based on the correction amount) by determining the defocus amount of a value detected by the focus detection apparatus 207 and the direction of the deviation based on an image photographed by the user. The image capturing apparatus 200 according to the present embodiment has an AF micro adjustment support (hereinafter referred to as MAS) mode. In the MAS mode, according to the first embodiment, a difference (an AF correction amount) between a lens position when an image selected is photographed and a lens position after the AF is stored in association with a bracket image. The AF correction amount is utilized as a correction amount (a numerical value displayed according to a scale in FIG. 4 described later) in the AF micro adjustment function.

Figure 2:
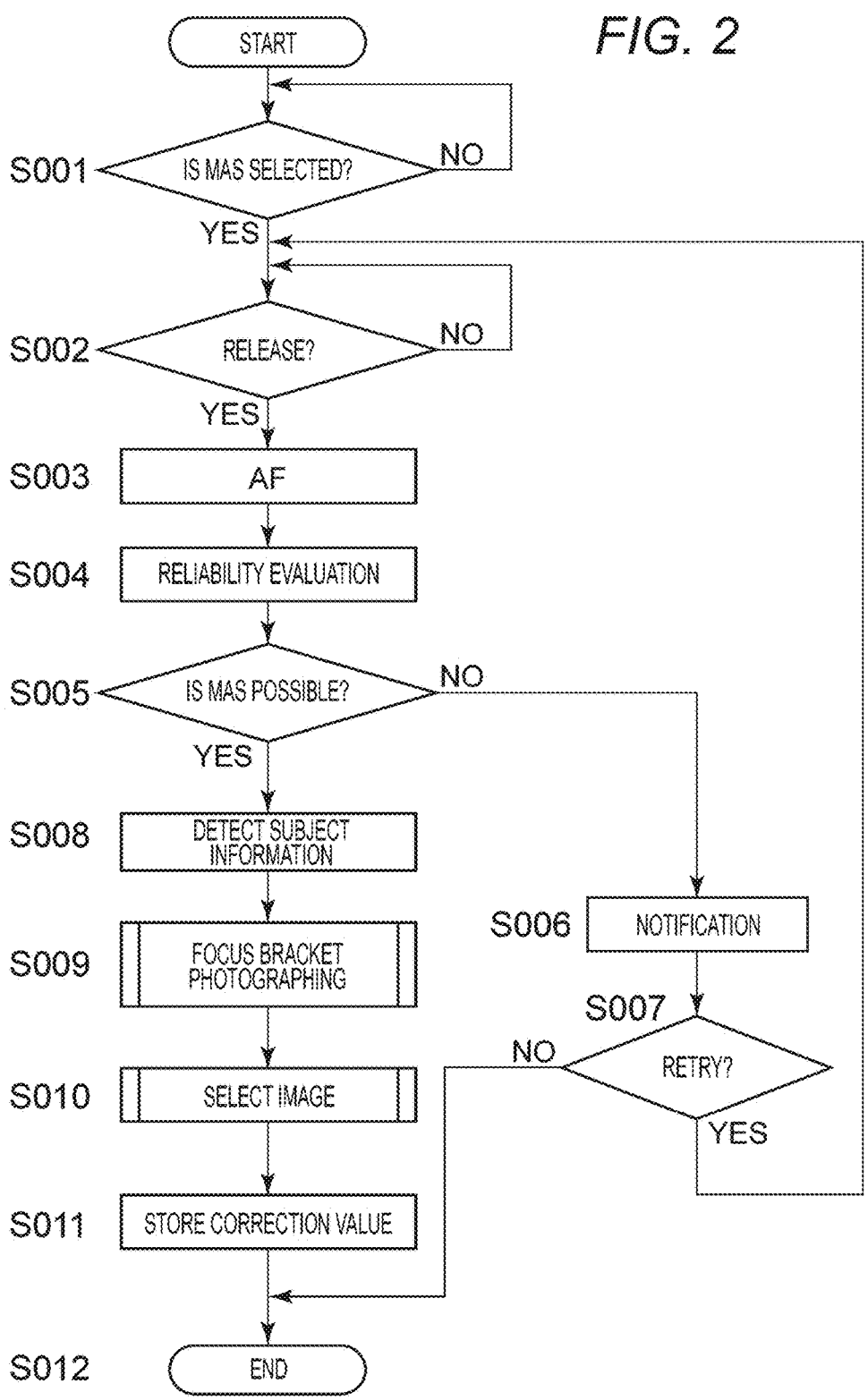
FIG. 2 is a flowchart of a micro adjustment support (MAS) mode of an image capturing apparatus 200.

FIG. 2 is a flowchart of the MAS mode, according to the first embodiment. In step S001, it is determined whether or not a user selects the MAS mode. When it is determined that the MAS mode is selected, the process proceeds to step S002.

In step S002, the operation detection unit 213 verifies whether or not the release button is pressed down by the user. When it is verified that the release button is pressed down, the process proceeds to step S003. Step S002 is repeatedly performed until it is verified that the release button is pressed down.

In step S003, an AF operation is performed. The focus detection apparatus 207 detects a defocus amount and drives the focus lens 101 according to the detected defocus amount. At this time, when data of the AF correction amount is obtained by MAS performed in advance, the following equation is established.

> Lens drive amount=focus detection result (defocus amount)+adjustment value (defocus amount adjustment data at manufacturing)+AF correction amount (MAS data)

When the drive of the focus lens 101 is completed, the process proceeds to step S004. In the present embodiment, along with the AF operation in S003, the CPU 210 (selection unit) selects a focus detection area used when the bracket photographing described later is performed. The selection of the focus detection area will be described later. Although the focus state is automatically adjusted by the AF operation in the present embodiment, the focus state may be manually adjusted.

In step S004, the CPU 210 (calculation unit) calculates an AF reliability evaluation value of a subject based on a signal received by the focus detection sensor (not illustrated) included in the focus detection apparatus 207. When the subject is dark (brightness is low) or contrast is low, focus detection accuracy of the focus detection apparatus 207 may degrade. A calculation formula is formed so that the AF reliability evaluation value is low when a subject where the focus detection accuracy of the subject is degraded is used. When the AF reliability evaluation value has been calculated, the process proceeds to step S005.

In step S005, whether or not MAS mode is possible is determined based on the AF reliability evaluation value calculated in step S004. When the AF reliability evaluation value is high, that is, when it is determined that the MAS mode is possible, the process proceeds to step S008, and when the AF reliability evaluation value is low, that is, when it is determined that the MAS mode is not possible, the process proceeds to step S006. The AF reliability evaluation value is calculated from a plurality of viewpoints, so that there is a plurality of AF reliability evaluation values. (As described above, there is a plurality of viewpoints such as brightness of the subject and contrast of the subject) In this case, it is possible to determine whether or not the MAS mode is possible based on whether or not all the AF reliability evaluation values are satisfied or based on an AF reliability evaluation value at a predetermined viewpoint.

In step S006, the display apparatus 212 notifies the user that a focus detection target subject is inappropriate for the MAS. When the notification is completed, the process proceeds to step S007.

In step S007, the user determines whether or not to perform the MAS again. A display to cause the user to determine whether or not to perform the MAS again is displayed on the display apparatus 212, and the user determines whether or not to perform the MAS again by operating operation buttons. The operation detection unit 213 detects the determination whether or not the user performs the MAS again by operating operation buttons, and when it is determined that the user performs the MAS again, the process returns to step S002. On the other hand, when it is determined that the user does not perform the MAS again, the process proceeds to step S012 and the MAS mode is completed.

In step S008, information of the subject is detected. Spatial frequency information of the subject is detected based on a signal received by the focus detection sensor (not illustrated) included in the focus detection apparatus 207. Regarding the detected spatial frequency information, a subject information flag which is a value digitized based on a condition that is set in the image capturing apparatus 200 in advance is stored in the EEPROM (memory) 211. In the present embodiment, when the spatial frequency information is higher than a set threshold value, the subject information flag is stored as 0, and when the spatial frequency information is lower than the set threshold value, the subject information flag is stored as 1. The detection of the subject information in this step is not limited to a case in which the focus detection sensor included in the focus detection apparatus 207 is used, but a subject detection sensor that is generally arranged in a finder and the image capturing element 209 may also be used. The subject information flag is set not only according to the spatial frequency information, but it may also be set according to the magnitude of edge information (an integrated value of difference between adjacent pixel values or the like) of a main subject (a subject to be focused). When the detection of the subject information is completed, the process proceeds to step S009.

In step S009, the focus bracket photographing is performed. When the focus bracket photographing is completed, the process proceeds to step S010.

In step S010, the CPU 210 selects an image that is in the best focusing state from among images which the CPU 210 has photographed by the focus bracket photographing in step S009. The selection of the image will be described later.

When the selection of the image is completed, the process proceeds to step S011.

Figure 3:
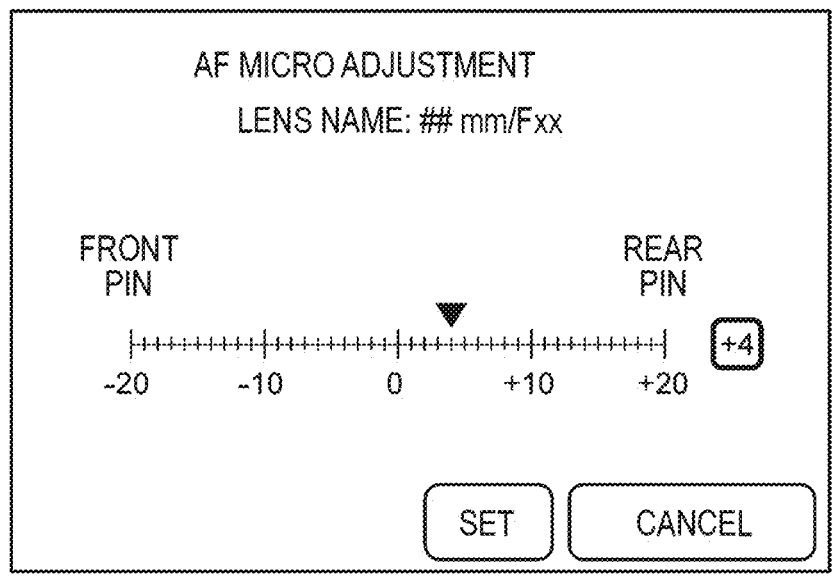
FIG. 3 is a diagram illustrating an example of a display screen when the MAS mode occurs a first time.
Figure 4:
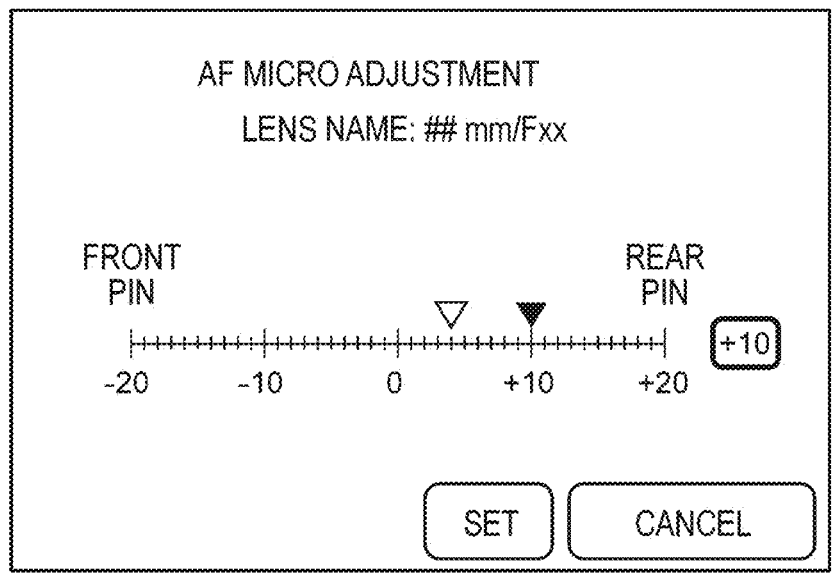
FIG. 4 is a diagram illustrating an example of a display screen when the MAS mode occurs other than the first time.

In step S011, a correction value is stored. The correction value is determined based on an AF correction amount corresponding to a lens position associated with an image selected by the user. When there is a plurality of images selected in step S010, a correction value corresponding to an average value of lens positions associated with the selected images is determined. The determined correction value is stored in the EEPROM (memory) 211. The stored correction value is notified to the user. FIG. 3 is a diagram illustrating an example of a screen on which the display apparatus 212 displays a correction value stored by MAS at this time when the MAS is the first time. FIG. 4 is a diagram illustrating an example of a screen on which the display apparatus 212 displays a stored correction value when the MAS at this time is not the first time and there is a correction value stored by a previous MAS. In FIG. 4, the white triangle represents the previous correction value and the black triangle represents a new correction value stored by a flow at this time. By performing a display illustrated in FIG. 4, the user can verify the stored correction value. When the correction value has been stored, the process proceeds to step S012 and the MAS mode is completed.

Selection of Focus Detection Area

Figure 7:
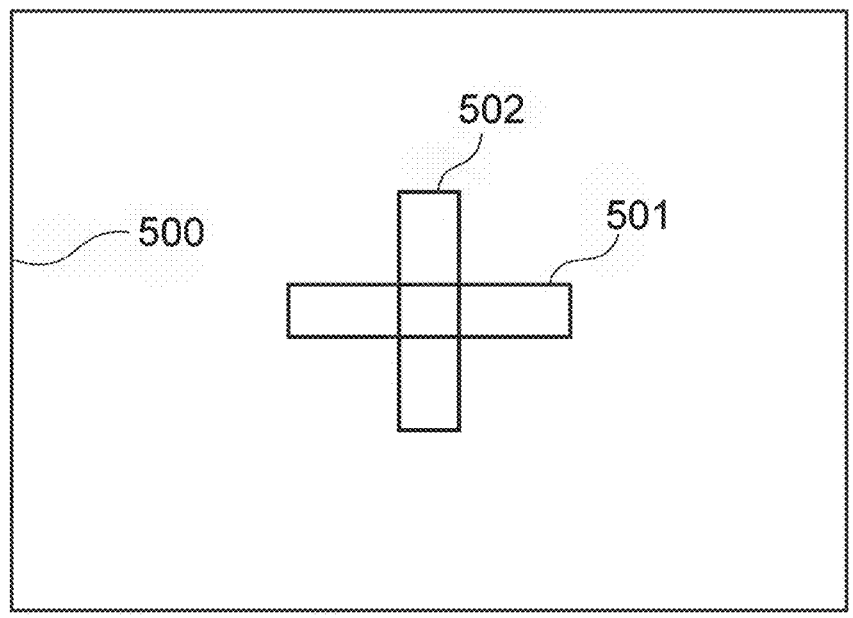
FIG. 7 is a diagram illustrating a focus detection area (a focus detecting field) of a focus detection apparatus of the image capturing apparatus.

Hereinafter, selection of a focus detection area which is used for AF processing in the bracket photographing will be described. FIG. 7 illustrates the focus detection area corresponding to the focus detection sensor of the focus detection apparatus of the image capturing apparatus of the present embodiment. Although other focus detection areas are omitted for simplicity of description, an image capturing apparatus including a plurality of focus detection areas is commonly used.

In FIG. 7, an image capturing area 500 is an area where a subject image is acquired by an image capturing element. Focus detection areas 501 and 502 are areas where the focus detection apparatus 207 detects a focus state. Each of the focus detection areas 501 and 502 corresponds to a partial area of the image capturing area. In the present embodiment, the focus detection areas 501 and 502 are arranged in a vertical direction and a horizontal direction respectively. The focus detection area 501 is a detection area corresponding to pixels arranged in a horizontal direction in a line sensor included in the focus detection apparatus 207. The line sensor detects a vertical line component of a main subject which is a subject to be focused in a range corresponding to the focus detection area 501. The focus detection area 502 is a detection area corresponding to pixels arranged in a vertical direction in a line sensor included in the focus detection apparatus 207. The line sensor detects a horizontal line component of the main subject in a range corresponding to the focus detection area 502. During photographing, the CPU 210 selects an optimal focus detection area from among the focus detection areas 501 and 502 according to the main subject.

Figure 8A:
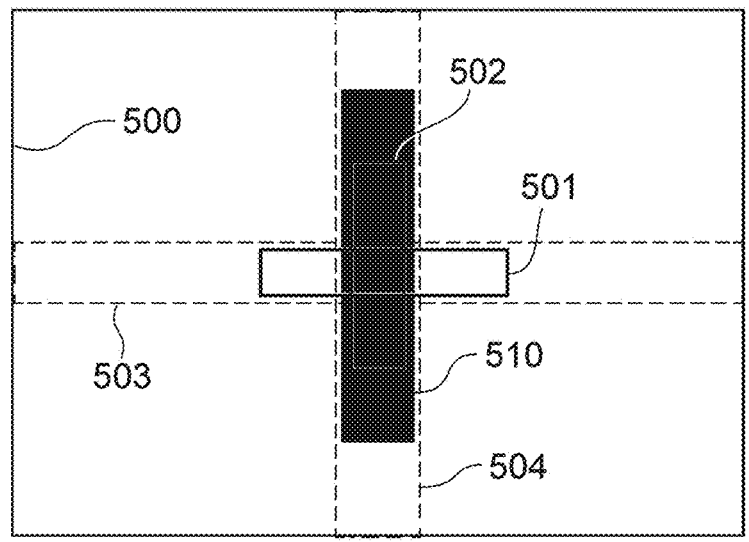
FIGS. 8A and 8B are diagrams illustrating a relationship between the focus detection area and a main subject.
Figure 8B:
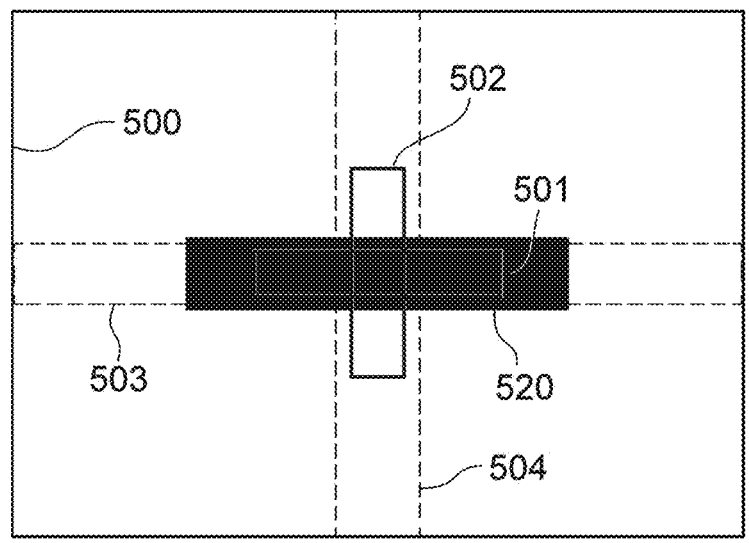

FIGS. 8A and 8B are diagrams illustrating a relationship between the focus detection area and the main subject. As an example of the main subject, a black line pattern 510 that is a long pattern in the vertical direction or a black line pattern 520 that is a long pattern in the horizontal direction is projected to the focus detection area 501 and the focus detection area 502.

FIG. 8A illustrates a situation intending to capture an image of the main subject in which a vertical line component is dominant. When intending to detect the long black line pattern 510 as the main subject in which the vertical line component is dominant, in the focus detection area 501 in which the vertical line component is detected, the black line pattern 510 which is long in the vertical direction overlaps only a central portion of the entire focus detection area 501. On the other hand, in the focus detection area 502 in which the horizontal line component is detected, the black line pattern 510 overlaps the entire focus detection area 502. Therefore, it is possible to detect a pattern in the focus detection area 501. However, it is difficult to detect a pattern in the focus detection area 502 because only a uniform image can be obtained from the black line pattern 510 in the focus detection area 502. In this case, the focus detection area 501 is selected as the focus detection area during photographing. In the present embodiment, the CPU 210 (selection unit) selects the focus detection area 501 when the vertical line component is greater than the horizontal line component by a predetermined ratio.

FIG. 8B illustrates a situation intending to capture an image of the main subject in which a horizontal line component is dominant. In the focus detection area 501, the black line pattern 520 which is the main subject in which the horizontal line component is dominant overlaps the entire focus detection area 501. On the other hand, in the focus detection area 502, the black line pattern 520 overlaps only the central portion of the entire focus detection area 502. Therefore, it is possible to detect a pattern in the focus detection area 502. However, it is difficult to detect a pattern in the focus detection area 501 because only a uniform image is obtained from the black line pattern 520 in the focus detection area 501. In this case, the focus detection area 502 is selected as the focus detection area during photographing. In the present embodiment, the CPU 210 selects the focus detection area 502 when the horizontal line component is greater than the vertical line component by a predetermined ratio.

Although FIGS. 8A and 8B illustrate an example of the black line pattern for easy understanding of the selection of the focus detection area, even when a pattern can be detected from both the focus detection areas 501 and 502, a focus detection area from which the pattern can be better detected is selected. In other words, when there is not a large difference between ratios of the vertical line component and the horizontal line component (when the difference is smaller than a predetermined ratio), a focus detection area from which the pattern can be better detected is selected. At this time, there may be an index for selecting the focus detection area in addition to the ratios of the vertical line component and the horizontal line component described in the present embodiment. In this case, the CPU 210 (calculation unit) calculates evaluation values for at least one index and selects a focus detection area of which evaluation value is the highest. For example, from among the focus detection areas 501 and 502, a focus detection area of which AF reliability evaluation value calculated in step S004 is higher may be selected. Although a configuration in which the focus detection area is automatically selected is illustrated in the present embodiment, it may be configured so that a user can select a focus detection area to be used in advance.

Focus Bracket Photographing

Figure 5:
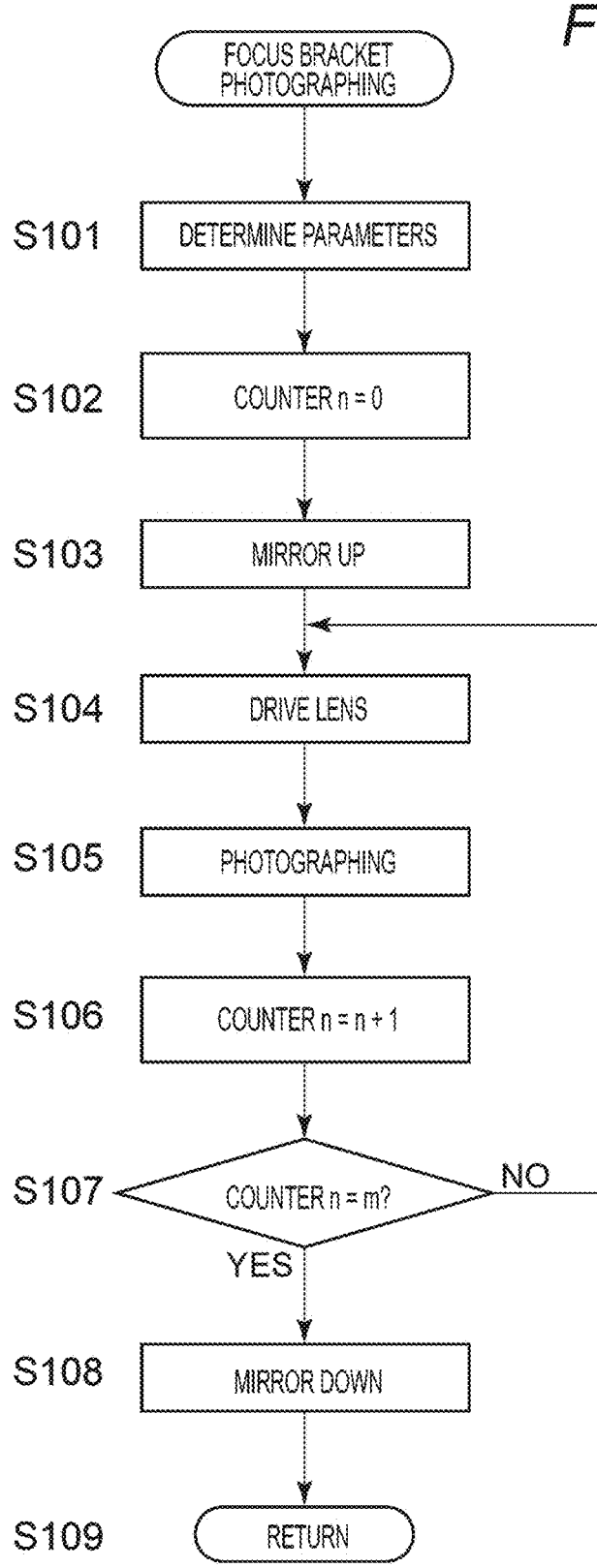
FIG. 5 is a flowchart of focus bracket photographing of the image capturing apparatus 200.

The image capturing apparatus according to the present embodiment has a function to perform the focus bracket photographing. The focus bracket photographing is a photographing method that sequentially acquires a plurality of images while changing a focus by every predetermined amount. FIG. 5 is a flowchart of the focus bracket photographing performed by the image capturing apparatus 200 of the first embodiment.

Figure 6:
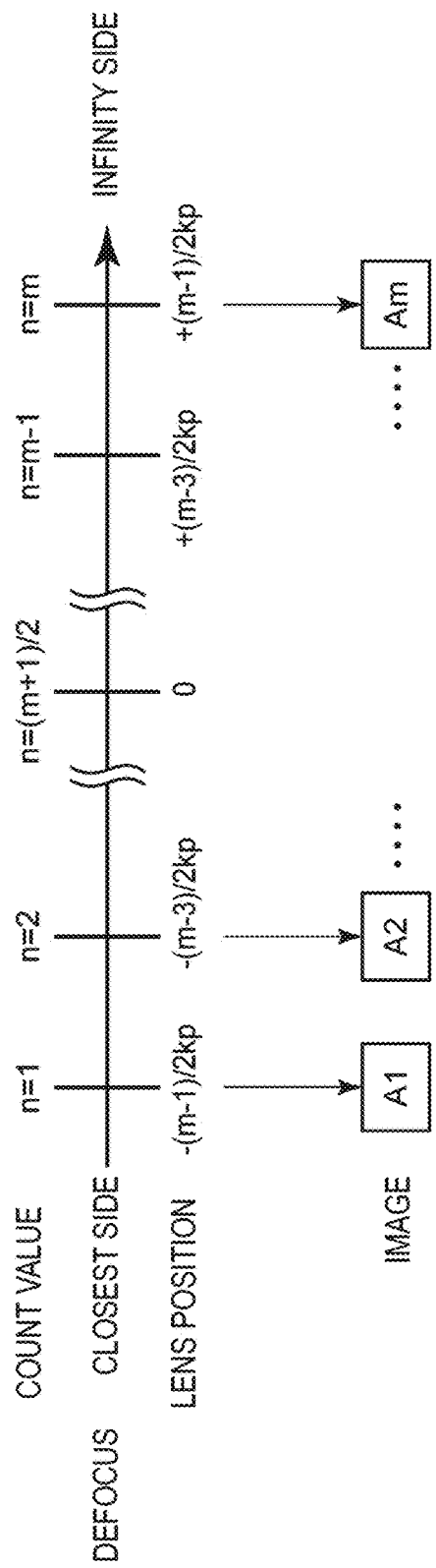
FIG. 6 is a diagram explaining parameters related to the focus bracket photographing.

In step S101, parameters related to the focus bracket photographing are determined. The parameters are the number of images to be obtained by the focus bracket photographing and a photographing position of the focus lens 101 in the focus bracket photographing. FIG. 6 is a diagram explaining the parameters related to the focus bracket photographing. In FIG. 6, the position of "lens position=0" is a position after AF, where the focus lens 101 is driven by the AF operation and then stops and which is the center position of the focus lens 101 in the bracket photographing. The focus lens 101 is driven to a position according to a count value of the counter 214. The parameters related to the focus bracket photographing are determined based on a value stored in step S008 in the flowchart illustrated in FIG. 2. When the subject information flag is 0, the number of photographed images m=7 is established, and when the subject information flag is 1, the number of photographed images m=9 is established. In general, the higher the spatial frequency of the subject, the easier the determination of the focusing state, so that the number of photographed images may be small.

The driving amount is an amount (kP) obtained by multiplying a correction interval P of the AF micro adjustment described above by a coefficient k (the coefficient k is an integer value greater than or equal to 2). In the present embodiment, when the subject information flag is 0, the coefficient k=2 is established, and when the subject information flag is 1, the coefficient k=4 is established. In general, the higher the spatial frequency of the subject, the easier the determination of the focusing state, so that it is possible to perform the determination even when the driving amount of the focus lens 101 is small. This is the same when the subject information is edge information, so that each parameter may be set according to how easy the determination of the focusing state of the subject is.

The parameters related to the focus bracket photographing may be arbitrarily determined by a user. It is possible to build a system suitable for the user by using parameters variable according to a level of the user. Although the number of photographed images and the driving amount, which are the parameters of the focus bracket photographing, are variables in the present embodiment, either one or both of them may be a fixed value or fixed values of the image capturing apparatus 200 and the photographing lens 100.

In step S102, the CPU 210 resets the counter 214 (the count value n=0 is established). When the counter has been reset, the process proceeds to step S103.

In step S103, a mirror up operation is performed in which the main mirror 201 retreats to the second position outside the photographing optical path and the sub-mirror 202 also retreats along with the main mirror 201.

After the mirror up operation is completed, in step S104, the focus lens 101 is driven. As described with reference to FIG. 6, when the count value n=1, the focus lens 101 moves to a position of −(m−1)/2×kP. When the count value n≥2, the focus lens 101 moves from a position at which the focus lens 101 stops toward the infinity side by +kP. In other words, the focus lens 101 moves to a position of −(m+1−2n)/2×kP according to the count value. When the drive of the focus lens 101 is completed, the process proceeds to step S105.

In step S105, still image photographing is performed. A photographed image is stored in an internal memory of the CPU 210 in association with a lens position when the image is photographed. When the photographed image has been recorded, the process proceeds to step S106.

In step S106, the count value of the counter 214 is incremented by one, and the process proceeds to step S107.

In step S107, it is determined whether or not the count value of the counter 214 reaches the number of photographed images m. When the count value reaches the number of photographed images m, the process proceeds to step S108, and when the count value does not reach the number of photographed images m, the process returns to step S104.

In step S108, a mirror down operation is performed in which the main mirror 201 moves to the first position and the sub-mirror 202 moves to a position inside the photographing optical path. Then, the process proceeds to step S109 and the focus bracket photographing is completed.

Image Selection after Focus Bracket Photographing

Figure 9:
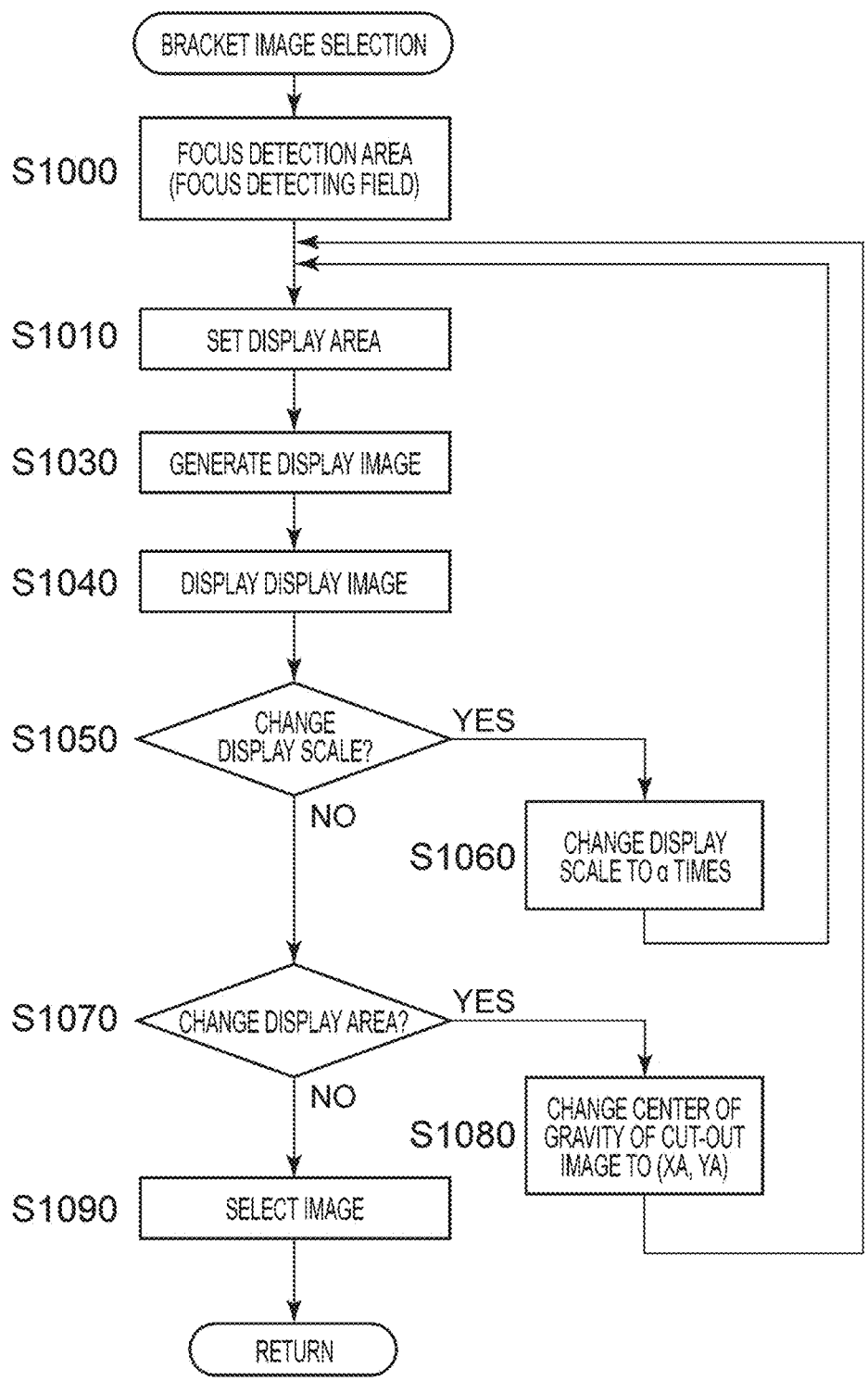
FIG. 9 is a flowchart related to image selection during the focus bracket photographing.

FIG. 9 is a flowchart related to image selection after the focus bracket photographing.

When image selection processing is started, in S1000, the focus detection area (the focus detecting field) which is selected and actually used during the focus bracket photographing is determined.

In S1010, the CPU 210 (display unit) performs processing that sets a part of each bracket image obtained by the focus bracket photographing as a display area for each part. The display area is set so as to include the focus detection area determined in S1000. When, like the focus detection area 501, the determined focus detection area is a detection area corresponding to pixels arranged in the horizontal direction in the line sensor included in the focus detection apparatus 207, the display area is set to be long in the horizontal direction. Similarly, when, like the focus detection area 502, the determined focus detection area is a detection area corresponding to pixels arranged in the vertical direction in the line sensor included in the focus detection apparatus 207, the display area is set to be long in the vertical direction. For example, referring to FIGS. 8A and 8B described above, in the present embodiment, when the CPU 210 (selection unit) selects the focus detection area 501 during photographing, the CPU 210 (display unit) selects a display area 503, and when the CPU 210 (selection unit) selects the focus detection area 502 during photographing, the CPU 210 (display unit) selects a display area 504. However, the display areas 503 and 504 are an example, and their sizes and aspect ratios are not intended to be limited.

The display areas of the bracket images are adjusted so that edges of the main subject are evenly arranged when the display areas are displayed side by side. This adjustment may be performed by extracting feature points of each image and performing image processing or may be performed based on shake information of the image capturing apparatus. By displaying the display areas in this way, it is easy for a user to compare differences between the images.

In S1030, a display image to be actually displayed by the display apparatus 212 is generated based on the display area of each bracket image that is set in S1010. Specifically, one image is generated in which images of a selected area of each bracket image that is set in S1010 are arranged in order of each bracket image. At this time, the arrangement direction of each display area is a direction perpendicular to a pixel arrangement of the focus detection area selected when the photographing is performed. In other words, for example, when the display area 503 that is long in the horizontal direction (a direction based on a horizontal line) is selected as a display area, a display area that is long in the horizontal direction is selected for the other bracket images.

Figure 10A:
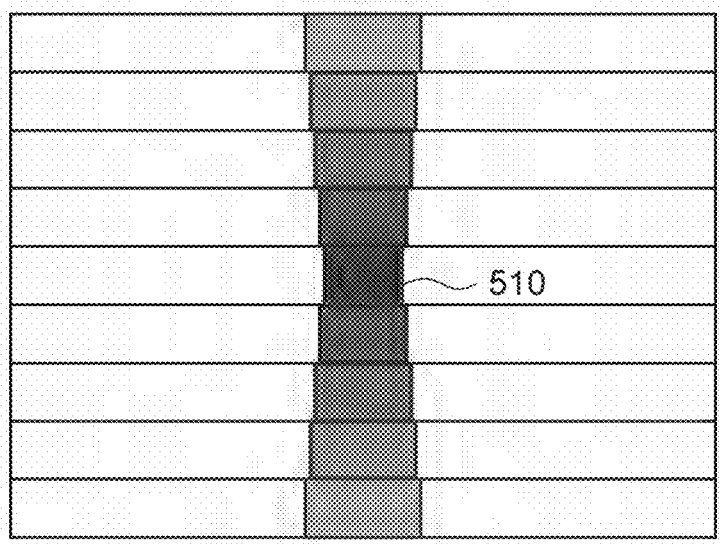
FIGS. 10A and 10B are diagrams illustrating a state in which display areas of bracket-photographed images are displayed side by side.

A display image in which these display areas are arranged side by side in a vertical direction (a direction based on a vertical line) as illustrated in FIG. 10A is generated. Further, for example, when the display area 504 that is long in the vertical direction (a direction based on a vertical line) is selected as a display area, a display area that is long in the vertical direction is selected for the other bracket images. A display image in which these display areas are arranged side by side in a horizontal direction (a direction based on a horizontal line) as illustrated in FIG. 10B is generated.

In S1040, the CPU 210 (display unit) displays the display image generated from the bracket images.

Figure 10B:
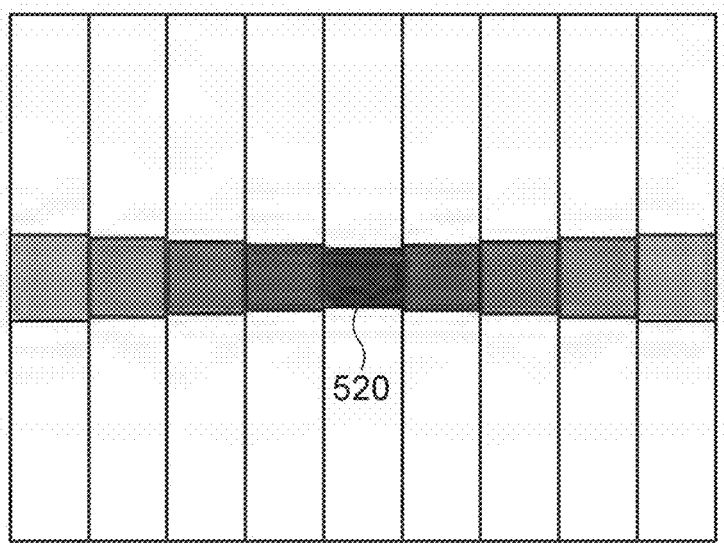

Each of FIGS. 10A and 10B illustrates a case in which the bracket photographing of nine images is performed and further illustrates a case in which the best focused image is located at the center, that is, the fifth image. The width and focus state of a black line pattern vary according to the focus state of the bracket image. Although the details will be described later, the width (the size) of the subject image varies according to a change of image magnification ratio due to a focusing operation and a blur of image due to a change of the focus. However, an image in the best focusing state is seen to be thinnest, so that the fifth line at the center is thinnest.

While a state in which the fifth image is best focused is illustrated here, there may be a case in which a display image, in which an endmost image is best focused, that is, the width of the endmost image is smallest, is generated and displayed depending on an actual state of the image capturing apparatus.

In this way, an image is displayed in which attention areas to be focused in the bracket images are arranged in one image generated in S1030, so that it is easy for a user to compare images with each other.

At this time, regarding the image to be displayed, an image on which processing such as edge enhancement processing is not performed can be displayed in order to cause the user to easily know the focus state. When the image has been displayed, the process proceeds to the next step S1050.

In S1050, it is determined whether or not a change operation of display scale of the displayed image is performed.

When it is determined that the change operation of display scale is not performed in S1050, the process proceeds to the next step S1070. When it is determined that the change operation of display scale is performed, the process proceeds to the next step S1060.

In S1060, display scale is changed according to the scale that is set by the user, and the process proceeds to S1010 again in order to generate a display image where a display area of scale that is set by the user. Then, in S1010, a display image scale is changed, and setting of the display area of the bracket image is performed again. Here, the change of the scale of the display area in S1060 can be performed in conjunction with that of the display areas of all the bracket images. By such a configuration, it is possible to compare the display areas of all the bracket images at the same scale, so that it is easy to compare the display areas. Based on the setting in S1010 described above, the display image is generated again in S1030 and the display image is displayed in S1040.

In S1070, it is determined whether or not the display area of the display image is changed.

In S1070, when it is determined that the display area is not changed, the process proceeds to the next step S1090. In S1070, when it is determined that the display area is changed, the process proceeds to the next step S1080.

In S1080, a new display area on which the change of the display area is reflected is set. At this time, regarding the change of the display area of each bracket image, it is possible to change the display areas of all the bracket images in conjunction with each other. By such a configuration, it is possible to compare the display areas of all the bracket images at the same position, so that it is easy to compare the display areas. Based on the new display area generated in S1080 in this way, the display image is generated again in S1030 and the display image is displayed in S1040.

On the other hand, when the display area is not changed, in S1090, the user selects an image that is in the best focusing state while verifying the selection on the display apparatus 212.

Selection of Best Focused Image

According to the present embodiment, the display areas are set at positions to which the bracket images to be compared correspond, and the bracket images are displayed side by side. Each bracket image is an image obtained by changing the focus position of the focus lens unit by a predetermined amount, so that each bracket image is seen as an image of which size is different from that of the actual image due to the change of image magnification ratio and the change of focus state. Here, a relationship between a change of focus, a change of image magnification ratio, and a change of the size of an image due to a blur is shown below.

f: Focal length of photographing lens
S: Distance from principal point of photographing lens to subject
S″: Distance from principal point of photographing lens to imaging plane
m: Height of image on image plane of an object of which height is 1 mm on subject surface When the above is defined, the following equation is established.

$$1/f=(1/S)+(1/S'')$$

$$m=S''/S$$

Calculation is performed by applying the following condition to the above equation as an example.

$$f=50 \text{ mm}$$

$$S=1000 \text{ mm}$$

A light flux that forms an image at a position of image height 1 mm on the imaging plane (at a position of image height 20 mm on the subject surface) is assumed. When the focus of the image plane of an image of the focus bracket photographing is changed to 0 and ±28 μm, the change of the size of the subject image on the imaging plane due to the change of image magnification due to defocus of 28 μm on the focus surface is as follows.

When the image height on the imaging plane in a state of 0 μm defocus is m0, and
the image height on the imaging plane in a state of 28 μm defocus is m28,
the following is obtained:

$$m28-m0=0.031 \text{ μm}$$

The change of the size of the image on the imaging plane, which is caused by defocus of the image on the imaging plane due to defocus of an imaging optical system, is as follows:

$$20*m/S''=0.56 \text{ μm}$$

From the above result, the change of the size of the image due to the defocus is as follows:

$$0.031 + 0.56 = 0.591 \ \mu m$$

Further, when a diaphragm value f is assumed to be 5.6 at which the focus can be generally detected using phase difference, the amount of change of the size of the image when the image is blurred on the imaging plane due to defocus of 28 μm is as follows:

$$28/5.6/2 = 2.5 \ \mu m \text{ (radius where the blur spreads)}$$

From the above results, the change of the size of the image due to the blur of the image is greater than the change of the size of the image due to the defocus, so that the width of the line of the image that is best focused is seen as the smallest.

Therefore, regarding the selection of the bracket image, an image where the width of the line of the main subject (common image pattern) is seen as the smallest among a plurality of bracket images displayed side by side may be selected.

Although an example in which the CPU arranges the images, a user visually verifies the images and manually selects an image is shown in the present embodiment, a best focused image may be automatically selected by recognizing the widths of the bracket images by performing image processing based on an algorithm or the like.

Second Embodiment

Next, an image capturing apparatus according to a second embodiment will be described. A schematic configuration of the image capturing apparatus is the same as that of the first embodiment, so that members, areas, and steps that have the same function are denoted by the same reference symbols and the description thereof will be omitted.

In the selection of the bracket image in the present embodiment (S1090), when it is difficult to determine an image that is in the focusing state from among a plurality of images, a user can select a plurality of images. In this case, an average value of the AF correction amounts of these images is defined as a final AF correction amount (MAS data). Further, when the user determines that the best focusing state is between two images photographed by the focus bracket photographing, the user can select the two images. In this case, a value between the AF correction amounts of the two images is defined as the final AF correction amount (MAS data). A value to be associated with the selected image may be an AF reliability evaluation value, so that a final AF reliability evaluation value may be obtained by using an evaluation value associated with a plurality of images. Here, it is possible to display one or a plurality of images selected by the user by enlarging the width or the height or both the width and height of the images. Thereby, the user can easily check the image or the images selected by the user.

Third Embodiment

Next, an image capturing apparatus according to a third embodiment will be described. A schematic configuration of the image capturing apparatus is the same as that of the first embodiment, so that members, areas, and steps that have the same function are denoted by the same reference symbols and the description thereof will be omitted.

In the embodiment described above, the bracket photographing is performed while the mirror up state is maintained in the focus bracket photographing in S009. However, in the present embodiment, the mirror down operation is performed for each photographing and the defocus amount of the focus is detected each time by the focus detection apparatus 207.

Focus Bracket Photographing in Third Embodiment

Figure 11:
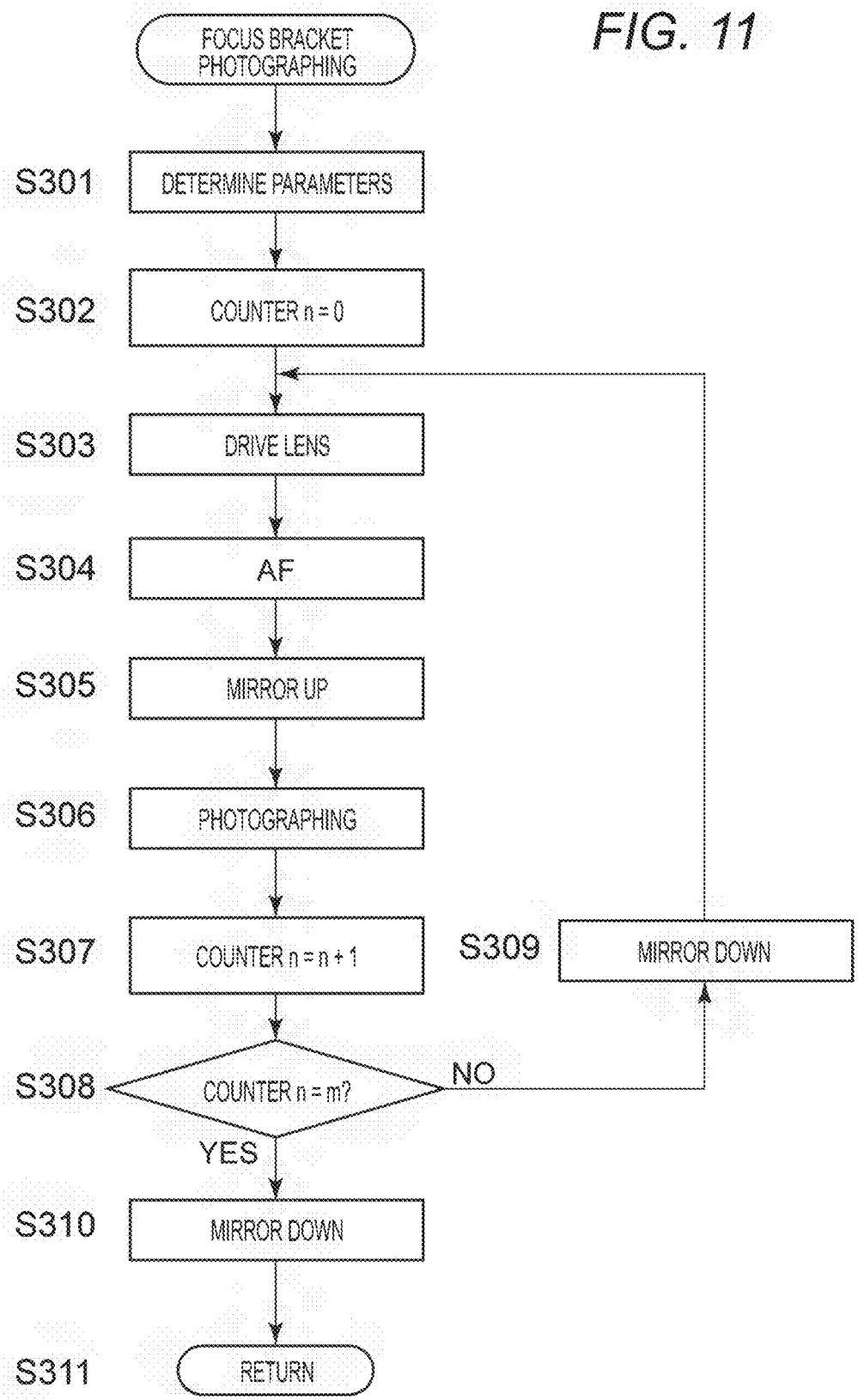
FIG. 11 is a flowchart of focus bracket photographing according to another embodiment.

FIG. 11 is a flowchart of the focus bracket photographing according to the present embodiment. S301 and S302 in the present embodiment respectively correspond to S101 and S102 in the first embodiment. In S303, a position to which a lens is driven is determined based on information acquired by the AF operation in S003. In S304, an AF operation is performed while remaining in the mirror down state at each position determined in S303 (the defocus amount of the focus is detected). At this time, the lens position is finely adjusted and either one of the focus detection area 501 in the horizontal direction and the focus detection area 502 in the vertical direction is selected. In step S305, the mirror up operation is performed to photograph a still image. Subsequently, in S306, a still image is photographed by using the focus detection area selected in S304. The photographed image is stored in an internal memory of the CPU 210 in association with the lens position when the image is photographed. In step S307, the count value of the counter 214 is incremented by 1, and the process proceeds to step S308. In step S308, it is determined whether or not the count value of the counter 214 reaches the number of photographed images m. When the count value reaches the number of photographed images m, the process proceeds to step S310, and when the count value does not reach the number of photographed images m, the mirror down operation is performed in S309 and then the process returns to step S303. In step S310, the mirror down operation is performed. Then, the process proceeds to step S311 and the focus bracket photographing is completed.

In the present embodiment, the focus detection area used during photographing may vary for each bracket image.

In the present embodiment, regarding the determination of the focus detection area in S1000, the focus detection area used in the AF operation in S003 is determined, and the display areas of each bracket image are selected in S1010 so that the display areas are wide in the direction of the focus detection area.

When the direction of the focus detection area used for the photographing varies depending on the bracket images, the focus detection areas that are actually used are determined and the display areas of each bracket image may be set so that the display areas are long in the direction of the focus detection area that has been more frequently used.

Other Embodiments

In the embodiments described above, the image capturing apparatus of phase-different AF method, in which the focus detection apparatus 207 includes a line sensor, is illustrated. However, an image capturing apparatus which detects a focus by a contrast AF system may also be used. In this case, the image capturing apparatus does not have a focus detection sensor such as a line sensor and detects a focus state by detecting the sharpness (detecting a contrast state) of an image generated based on an image signal from an image capturing element. In S1010, a display area is selected according to a reading direction of pixels of the image capturing element (a direction in which an edge is detected). Specifically, when reading the pixels of the image capturing element in the horizontal direction, a display area is selected which is long in the vertical direction and which includes a focused portion in the image, and when reading the pixels of the image capturing element in the vertical direction, a display area is selected which is long in the horizontal direction and which includes a focused portion in the image.

Further, the image capturing apparatus may be an image capturing apparatus that detects a focus by the imaging plane phase-different AF method. In this case, the image capturing apparatus has an image capturing element including pixels (focus detection pixels) that can detect the defocus amount of the focus. According to the imaging plane phase-different AF method, it is possible to detect the defocus amount of the focus in at least two directions. In S1010, the display area is selected according to a direction in which the defocus amount of the focus is detected. Specifically, when reading the pixels of the image capturing element in the horizontal direction, a display area is selected which is long in the vertical direction and which includes the focus detection area, and when reading the pixels of the image capturing element in the vertical direction, a display area is selected which is long in the horizontal direction and which includes the focus detection area.

In the embodiments described above, the image capturing apparatus is shown which has the focus detection areas arranged in the horizontal direction and the vertical direction, respectively. However, the focus detection areas are not necessarily arranged in the horizontal direction and the vertical direction, but may be arranged in oblique directions. In this case, the images need not necessarily be arranged in a direction perpendicular to the direction of the focus detection area.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-024483, filed Feb. 10, 2015, which is hereby incorporated by reference herein in its entirety.

What is claimed is:

1. An image capturing apparatus comprising:
a bracket photographing unit configured to sequentially photograph a plurality of images while changing a focus position of a lens;
a calculation unit configured to calculate an evaluation value in a horizontal direction and an evaluation value in a vertical direction; and
a display unit configured to select a display area for each of the plurality of images photographed by the bracket photographing unit and display a plurality of the display areas,
wherein when the evaluation value in the horizontal direction for a main subject, which is calculated by the calculation unit, is higher than the evaluation value in the vertical direction, the display unit selects and displays a display area that is longer in the horizontal direction than in the vertical direction, and when the evaluation value in the vertical direction is higher than the evaluation value in the horizontal direction, the display unit selects and displays a display area that is longer in the vertical direction than in the horizontal direction, and
the main subject is a subject to be focused.

2. The image capturing apparatus according to claim 1, wherein the evaluation value is a value based on at least a ratio of a vertical line component and a horizontal line component and the calculation unit calculates the evaluation value in the horizontal direction and the evaluation value in the vertical direction of the main subject for a corresponding focus detection area.

3. The image capturing apparatus according to claim 2, wherein when the ratio of the vertical line component is greater than a predetermined ratio, the evaluation value in the horizontal direction is higher than that when the ratio in the vertical line component is smaller than or equal to the predetermined ratio, and when the ratio of the horizontal line component is greater than a predetermined ratio, the evaluation value in the vertical direction is higher than that when the ratio in the horizontal line component is smaller than or equal to the predetermined ratio.

4. The image capturing apparatus according to claim 2, wherein when the evaluation value in the horizontal direction is the same as the evaluation value in the vertical direction, the display unit displays a display area that is long in a predetermined direction.

5. The image capturing apparatus according to claim 1, further comprising:
a memory configured to store data related to a lens position when the bracket photographing is performed in association with each image photographed by the bracket photographing unit; and
a control unit configured to drive a focus lens based on data related to a lens position associated with a display area selected by a user from among the plurality of display areas displayed by the display unit.

6. The image capturing apparatus according to claim 4, further comprising:
wherein the lens position includes data related to a lens drive amount.

7. The image capturing apparatus according to claim 1, wherein the display area is a part of an image photographed by the bracket photographing unit.

8. The image capturing apparatus according to claim 1, wherein when the evaluation value in the horizontal direction for the main subject that is a subject to be focused is higher than the evaluation value in the vertical direction, the display unit displays the plurality of display areas by arranging the plurality of display areas in the horizontal direction, and when the evaluation value in the vertical direction is higher than the evaluation value in the horizontal direction, the display unit displays the plurality of display areas by arranging the plurality of display areas in the vertical direction.

9. The image capturing apparatus according to claim 8, wherein when the evaluation value in the horizontal direction is the same as the evaluation value in the vertical direction, the display unit displays the plurality of display areas by arranging the plurality of display areas in a predetermined direction.

10. The image capturing apparatus according to claim 1, wherein when a display scale of one of the plurality of display areas displayed by the display unit is changed, the display unit changes the display scale of the other display areas in the same manner.

11. The image capturing apparatus according to claim 1, wherein when at least one display area of the plurality of display areas displayed by the display unit is changed, the display unit also changes the display areas of the other images in the same manner.

12. The image capturing apparatus according to claim 1, wherein the display unit automatically selects and displays a pattern of which line width is the smallest of image patterns common in a plurality of image display areas displayed by the display unit.

13. The image capturing apparatus according to claim 1, wherein when a user selects at least one image from a plurality of images displayed by the display unit, the display unit displays the selected image by increasing a width or a height of the image.

14. The image capturing apparatus according to claim 1, further comprising:
a focus detection sensor configured to photoelectrically convert a pair of subject images, which pass through different positions of a photographing lens to be formed, into a pair of subject image signals;
a focus detection unit configured to detect a defocus amount of focus by using the pair of subject image signals photoelectrically converted by the focus detection sensor; and
a control unit configured to drive a focus lens based on data related to a lens position associated with a display area selected by a user from among the plurality of display areas displayed by the display unit,
wherein the focus detection unit detects the defocus amount of focus in a direction perpendicular to the horizontal direction or the vertical direction of which evaluation value is higher than the other, and
the control unit drives the focus lens based on a defocus amount of focus detected by the focus detection unit.

15. The image capturing apparatus according to claim 1, further comprising:
an image capturing element configured to output two image signals having different parallaxes respectively;
a focus detection unit configured to detect a defocus amount of focus by using the two image signals having different parallaxes outputted from the image capturing element; and
a control unit configured to drive a focus lens based on data related to a lens position associated with a display area selected by a user from among the plurality of display areas displayed by the display unit,
wherein the focus detection unit detects the defocus amount of focus in a direction perpendicular to the horizontal direction or the vertical direction of which evaluation value is higher than the other, and
the control unit drives the focus lens based on a defocus amount of focus detected by the focus detection unit.

16. The image capturing apparatus according to claim 1, further comprising:
an image capturing element configured to photoelectrically convert an optical signal into an image signal; and
a contrast state detection unit configured to detect a contrast state of the image signal,
wherein a direction in which the contrast state is detected is the same as a direction in which the plurality of display areas are arranged.

17. An image capturing apparatus comprising:
a bracket photographing unit configured to sequentially photograph a plurality of images while changing a focus position of a lens;
a detection unit configured to detect a defocus amount of focus by using a pair of image signals corresponding to a focus detection area, which are acquired with different parallaxes;
a control unit configured to drive a focus lens based on a detection result of the detection unit; and
a display unit configured to select a display area for each of the plurality of images photographed by the bracket photographing unit and display a plurality of the display areas by arranging the plurality of the display areas,
wherein when the images are sequentially photographed, the detection unit detects a defocus amount of images in order to detect a focus, and
the display unit selects and displays a display area so that a length in a direction in which the detection unit detects a defocus amount by using the pair of image signals for the detection result used by the control unit is longer than a length in a direction perpendicular to the direction in which the detection unit detects the defocus amount by using the pair of image signals.

18. The image capturing apparatus according to claim 17, further comprising:
a memory configured to store data related to a lens position when the bracket photographing unit performs photographing in association with each image photographed by the bracket photographing unit,
wherein the control unit drives a focus lens based on data related to a lens position associated with a display area selected by a user from among the plurality of display areas displayed by the display unit.

19. The image capturing apparatus according to claim 18, wherein the lens position includes data related to a lens drive amount.

20. The image capturing apparatus according to claim 17, wherein the display area is a part of an image photographed by the bracket photographing unit.

21. The image capturing apparatus according to claim 17, the display unit displays the plurality of display areas by arranging the plurality of the display areas in the direction perpendicular to the direction in which the detection unit detects the defocus amount by using the pair of image signals for the detection result used by the control unit.

22. The image capturing apparatus according to claim 17, wherein when a display scale of one of the plurality of display areas displayed by the display unit is changed, the display unit changes the display scale of the other display areas in the same manner.

23. The image capturing apparatus according to claim 17, wherein when at least one display area of the plurality of display areas displayed by the display unit is changed, the display unit also changes the display areas of the other images in the same manner.

24. The image capturing apparatus according to claim 17, wherein the display unit automatically selects and displays a pattern of which line width is the smallest of image patterns common in a plurality of image display areas displayed by the display unit.

25. The image capturing apparatus according to claim 17, wherein when a user selects at least one image from a plurality of images displayed by the display unit, the display unit displays the selected image by increasing a width or a height of the image.

26. A method of displaying an image, the method comprising:
- a bracket photographing step of sequentially photographing a plurality of images while changing a focus position of a lens;
- a calculation step of calculating an evaluation value in a horizontal direction and an evaluation value in a vertical direction; and
- a display step of selecting a display area for each of the plurality of images photographed in the bracket photographing step and displaying a plurality of the display areas,
- wherein, in the display step, when the evaluation value in the horizontal direction for a main subject, which is calculated in the calculation step, is higher than the evaluation value in the vertical direction, a display area that is longer in the horizontal direction than in the vertical direction is selected and displayed, and when the evaluation value in the vertical direction is higher than the evaluation value in the horizontal direction, a display area that is longer in the vertical direction than in the horizontal direction is selected and displayed, and
- the main subject is a subject to be focused.

27. A method of displaying an image, the method comprising:
- a bracket photographing step of sequentially photographing a plurality of images while changing a focus position of a lens;
- a detection step of detecting a defocus amount of focus by using a pair of image signals corresponding to a focus detection area, which are acquired with different parallaxes;
- a control step of driving a focus lens based on a detection result of the detection step; and
- a display step of selecting a display area for each of the plurality of images photographed in the bracket photographing step and displaying a plurality of the display areas by arranging the plurality of the display areas,
- wherein, in the detection step, when the images are sequentially photographed, a defocus amount of images is detected in order to detect a focus by the detection step, and
- in the display step, a display area is selected and displayed so that a length in a direction in which a defocus amount by using the pair of image signals is detected in the detection step for the detection result used in the control step is longer than a length in a direction perpendicular to the direction in which the defocus amount by using the pair of image signals is detected.

* * * * *